(12) United States Patent
Camper et al.

(10) Patent No.: US 9,959,496 B2
(45) Date of Patent: May 1, 2018

(54) MICROPROCESSOR-CONTROLLED TAMPER DETECTION SYSTEM

(71) Applicants: Franklin J. Camper, Hueytown, AL (US); Scott Nordness, Hoover, AL (US); William P. Gulas, Birmingham, AL (US)

(72) Inventors: Franklin J. Camper, Hueytown, AL (US); Scott Nordness, Hoover, AL (US); William P. Gulas, Birmingham, AL (US)

( * ) Notice: Subject to any disclaimer, the term of this patent is extended or adjusted under 35 U.S.C. 154(b) by 83 days.

(21) Appl. No.: 15/239,744

(22) Filed: Aug. 17, 2016

(65) Prior Publication Data

US 2017/0068881 A1    Mar. 9, 2017

Related U.S. Application Data

(60) Provisional application No. 62/233,662, filed on Sep. 28, 2015, provisional application No. 62/206,596, filed on Aug. 18, 2015.

(51) Int. Cl.
*G06K 19/077* (2006.01)
*B32B 27/08* (2006.01)
(Continued)

(52) U.S. Cl.
CPC ........ *G06K 19/07798* (2013.01); *B32B 15/09* (2013.01); *B32B 15/20* (2013.01);
(Continued)

(58) Field of Classification Search
CPC ....... G06K 19/07798; G06K 19/07722; B32D 2250/244; B32B 27/08; B32B 15/09; B32B 15/20; B32B 27/36; B32B 2307/202; B32B 2307/206; B32B 2307/518; B32B 2307/632; B32B 2439/40; B32B 2255/10;
(Continued)

(56) References Cited

U.S. PATENT DOCUMENTS

| 4,593,384 A * | 6/1986 | Kleijne ................... G06F 21/87 235/487 |
| 7,982,604 B2 * | 7/2011 | Nichols ................. G06Q 10/08 340/541 |

(Continued)

*Primary Examiner* — Thomas Alunkal
(74) *Attorney, Agent, or Firm* — Jones IP Law, LLC; Dennis W. Jones

(57) ABSTRACT

A microprocessor-controlled system for monitoring a package or container to detect unwanted tampering, recording parameters related to the tampering, and optionally for initiating countermeasures in response to the tampering, is provided. Upon sealing the material within the container, a microprocessor arms the system and a clock function begins. An external contact point provides capability for the package sender to record the microprocessor serial number and sealing time. If the package is punctured, cut, or otherwise damaged in route, that event is recorded by the microprocessor, a reset function is activated for the next potential event. Upon receipt of the package, the receiver may interrogate the package and download the available event log. Knowledge of the package transit route provides for comparison with elapsed time and calculation of the location of any tampering or damage.

19 Claims, 11 Drawing Sheets

(51) Int. Cl.
  *B32B 15/09*   (2006.01)
  *B32B 15/20*   (2006.01)
  *B32B 27/36*   (2006.01)
  *B65D 79/02*   (2006.01)

(52) U.S. Cl.
  CPC .............. *B32B 27/08* (2013.01); *B32B 27/36* (2013.01); *B65D 79/02* (2013.01); *G06K 19/07722* (2013.01); *B32B 2250/244* (2013.01); *B32B 2255/10* (2013.01); *B32B 2255/205* (2013.01); *B32B 2307/202* (2013.01); *B32B 2307/206* (2013.01); *B32B 2307/518* (2013.01); *B32B 2307/54* (2013.01); *B32B 2307/546* (2013.01); *B32B 2439/40* (2013.01); *B32B 2457/00* (2013.01); *B65D 2101/00* (2013.01)

(58) Field of Classification Search
  CPC .......... B32B 2255/205; B32B 2307/54; B65D 79/00
  See application file for complete search history.

(56) References Cited

U.S. PATENT DOCUMENTS

| | | | | |
|---|---|---|---|---|
| 8,970,247 | B2* | 3/2015 | Oomura | H01L 23/576 324/762.03 |
| 2005/0242957 | A1* | 11/2005 | Lindsay | G06K 19/0716 340/572.7 |
| 2006/0049941 | A1* | 3/2006 | Hunter | G01R 22/066 340/545.6 |
| 2006/0086534 | A1* | 4/2006 | Oggioni | H05K 1/0275 174/261 |
| 2008/0036598 | A1* | 2/2008 | Oggioni | G06F 21/87 340/568.1 |
| 2010/0187527 | A1* | 7/2010 | Van Geloven | H01L 23/576 257/48 |
| 2011/0083975 | A1* | 4/2011 | McGrane | B65D 75/20 206/1.5 |
| 2013/0147625 | A1* | 6/2013 | Sayegh | G08B 13/2451 340/568.2 |
| 2014/0305828 | A1* | 10/2014 | Salvo | G08B 13/1654 206/459.1 |

* cited by examiner

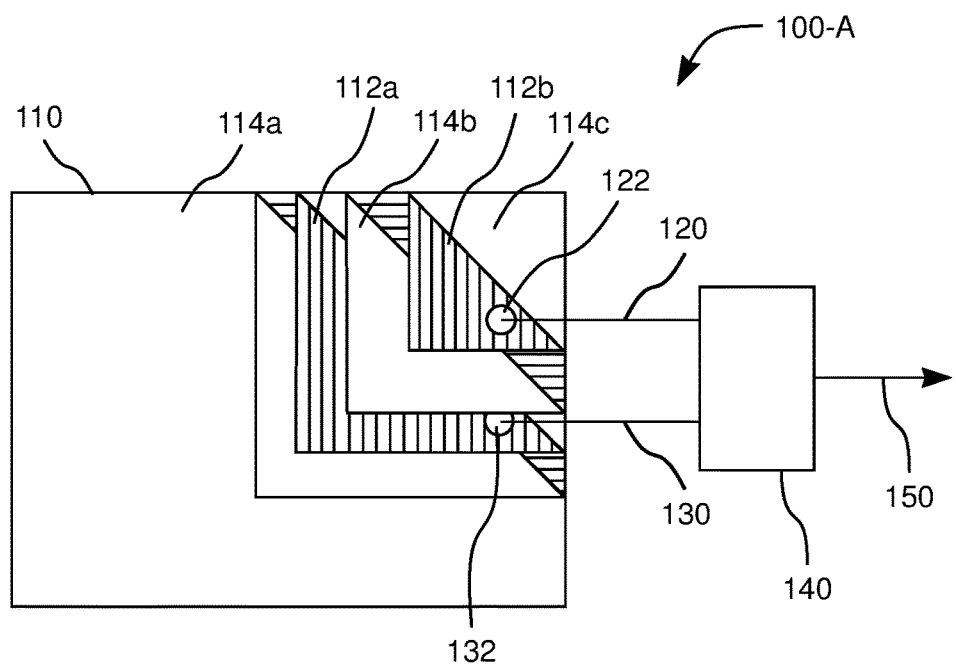
Fig. 2-A
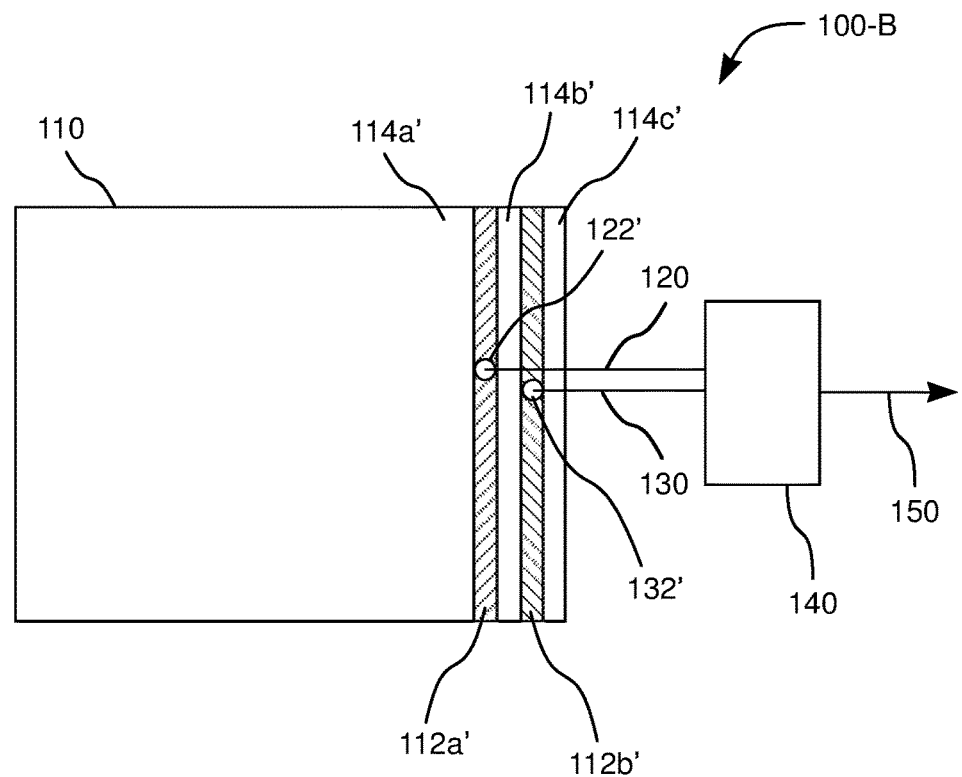
Fig. 2-B

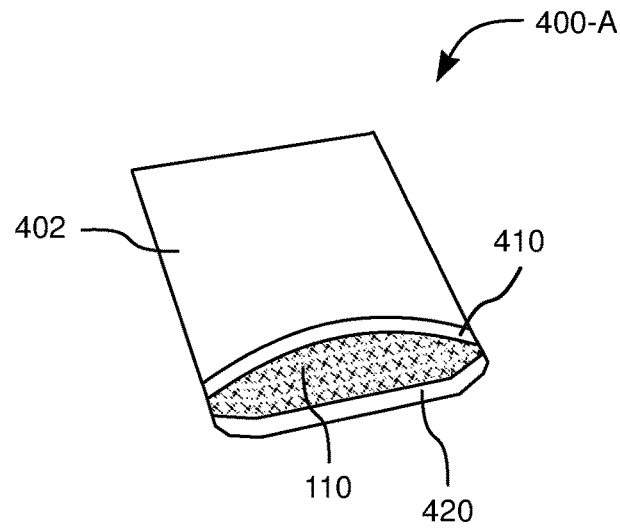
Fig. 4-A
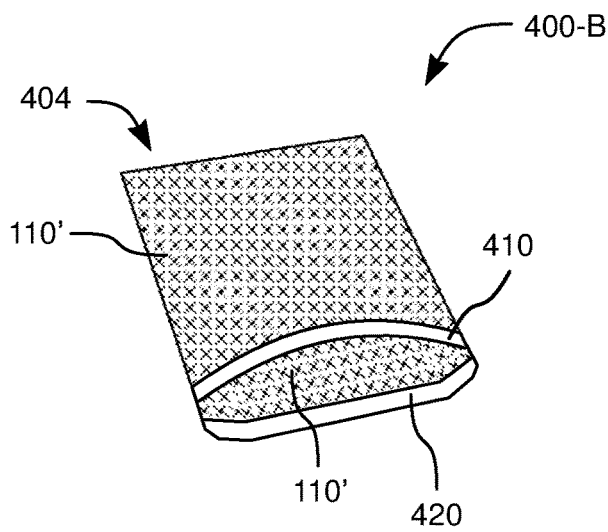
Fig. 4-B

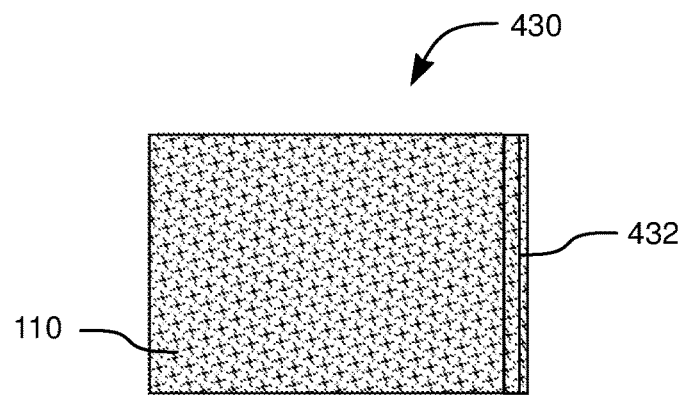
Fig. 4-C
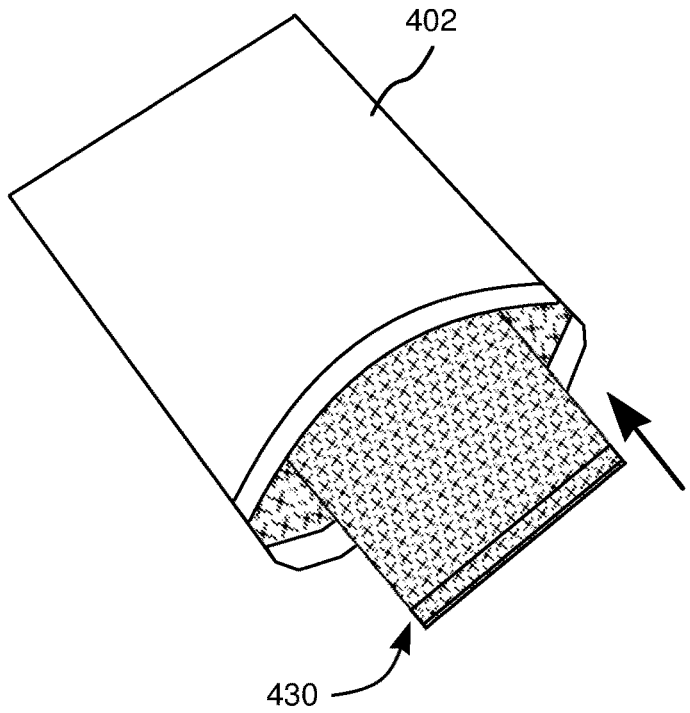
Fig. 4-D

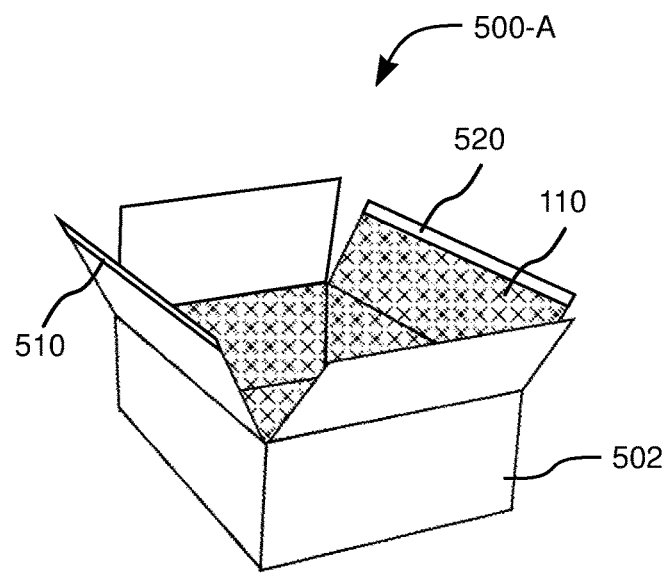
Fig. 5-A
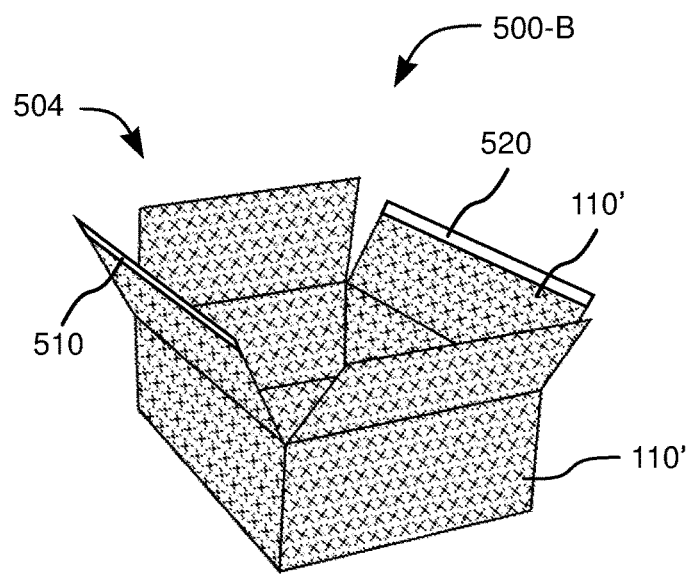
Fig. 5-B

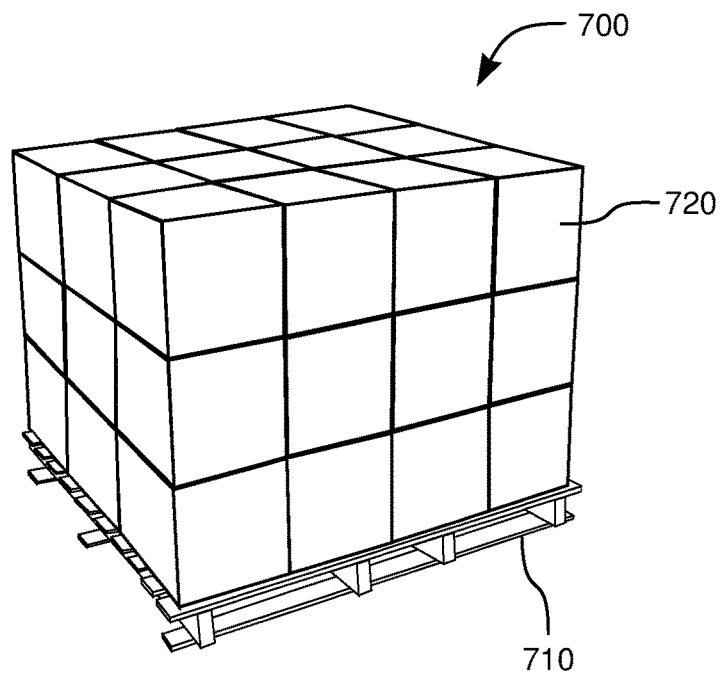
Fig. 7-A
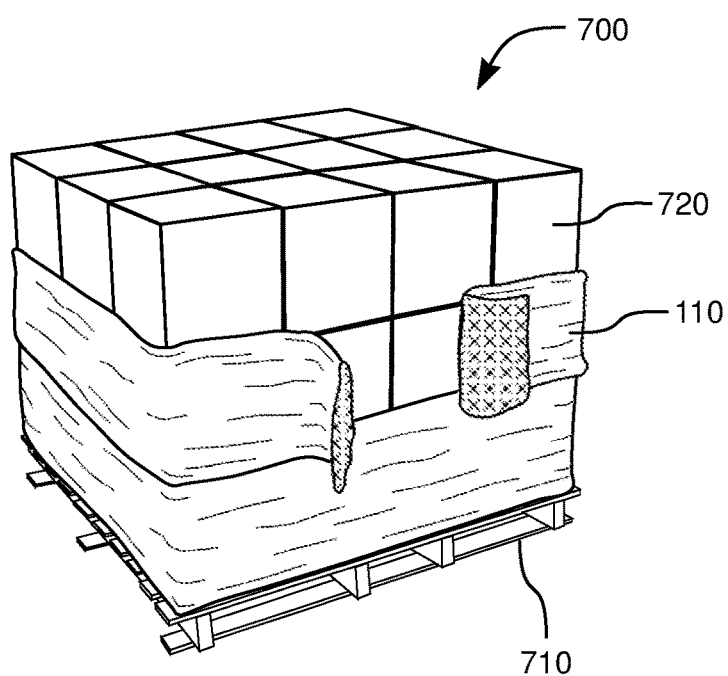
Fig. 7-B

MICROPROCESSOR-CONTROLLED TAMPER DETECTION SYSTEM

CROSS-REFERENCE TO RELATED APPLICATIONS

This application claims the benefit of U.S. Provisional Application No. 62/233,662, entitled "Microprocessor-Controlled Tamper Detection System," filed Sep. 28, 2015, and of U.S. Provisional Application No. 62/206,596, entitled "Microprocessor-Controlled Tamper Detection System," filed Aug. 18, 2015, each of which is incorporated herein by reference as if set forth herein in its entirety.

BACKGROUND

This invention pertains to the security of packages, containers, or materials that can be wrapped by film-type packaging. More particularly, this invention pertains to a microprocessor-controlled tamper detection system for detection of tampering or damage to a package, container, or anything that needs to remain secure, and also for initiating countermeasures in response to the tampering.

BRIEF SUMMARY

According to one embodiment of the present invention, a microprocessor-controlled system is provided for monitoring a package or container to detect unwanted tampering, recording parameters related to the tampering, and optionally for initiating countermeasures in response to the tampering.

The tamper detection system provides for detection of tampering more-so than its prevention, although countermeasures are provided for some embodiments.

Upon sealing the material within the container, a microprocessor arms the system and a clock function begins. An external contact point provides capability for the package sender to record the microprocessor serial number and sealing time. If the package is punctured, cut, or otherwise damaged in route, that event is recorded by the microprocessor, a reset function is activated for the next potential event. Upon receipt of the package, the receiver may interrogate the package and download the available event log. Knowledge of the package transit route provides for comparison with elapsed time and calculation of the location of any tampering or damage.

According to one embodiment, the system provides (1) a layered composite material that includes a combination having two flexible conductive layers separated by an inner non-conductive layer, and the combination contained within two separate outer non-conductive layers, each respective inner and outer non-conductive layers being a thin polyester film, the layered composite material providing flexibility for enclosure and containment of one or more items, (2) a thin film microprocessor within a portion of the layered composite material, the microprocessor having a unique embedded identifier, (3) the microprocessor connected to the respective conductive layers via a first terminal at the first flexible conductive layer and a second terminal at the second flexible conductive layer, and (4) one or more modules for execution by the microprocessor to (a) arm the system upon the one or more items being sealed within the layered composite material, (b) upon determination of a change in electrical properties of the layered composite material, recording a detected event for evidence of tampering, the event including time and other available data, and (c) upon recording the detected event, resetting the system for possible detection of a future event.

In one embodiment, each non-conductive layer is biaxially-oriented polyethylene terephthalate (BoPET). In another embodiment, each conductive layer is a metal foil.

In one embodiment, the metal foil is aluminum, and in another embodiment, the metal foil is an aluminum alloy.

In one embodiment, at least one non-conductive layer includes a thin film metalized layer deposited onto a surface of the biaxially-oriented polyethylene terephthalate to replace one of the flexible conductive layers.

In another embodiment, at least one non-conductive layer includes a spray-on metalized layer deposited onto a surface of the biaxially-oriented polyethylene terephthalate to replace one of the flexible conductive layers.

In one embodiment, the thin film metalized layer includes gold, aluminum, or indium tin oxide.

In one embodiment, each thin polyester film is manufactured and stretched to provide high tensile strength.

In another embodiment, the system includes at least one sensor within the layered composite material, for measurement of data including temperature, barometric pressure, altitude, moisture, and/or crush force.

In one embodiment, the system provides for retrieving data from at least one sensor. In another embodiment, the system provides for recording and/or logging the retrieved data in accordance with the detected event. In another embodiment, the system provides an action in response to the detected event in accordance with the retrieved data.

In one embodiment, the system provides for (1) arming itself upon one or more items being sealed by a layered composite material that includes a combination having two flexible conductive layers separated by an inner non-conductive layer, and the combination contained within two separate outer non-conductive layers, each respective inner and outer non-conductive layer being a thin polyester film, the layered composite material providing flexibility for enclosure and containment of the one or more items, (2) upon determination of a change in electrical properties of the layered composite material, recording an event for evidence of tampering, that includes time and other available data, and (3) upon recordation of the event, resetting and rearming the system for possible detection of a future event.

In one embodiment, the system is armed via a thin film microprocessor within a portion of the layered composite material, the microprocessor including a unique embedded identifier.

In another embodiment, the system arms at least one sensor within the layered composite material, the at least one sensor providing measurement data for temperature, barometric pressure, altitude, moisture, and/or crush force. In another embodiment, the system retrieves data from the sensor(s) within the layered composite material. In yet another embodiment, the system records the retrieved data from the sensor(s) within the layered composite material. In yet another embodiment, the system executes an action in response to the retrieved data from the sensor(s). In yet another embodiment, the system retrieves recorded event data and other retrieved data from the microprocessor.

In various embodiments, the tamper detection system provides capability for shipping of pharmaceuticals, legal evidence, confidential documents, and such like, with greater additional security and accountability than ever before. The relative low cost provides for wide use by customs officials, carriers such as FedEx and UPS, legal industry, medical industry, the military, and the public at large.

The tamper detection systems described herein can be used to provide tamper and damage detection security to many closed systems, from a simple envelope, to a box, a vehicle, and even a space craft or fighter jet. Specific embodiments provide many uses for the tamper detection system. Such anti tamper detection includes letters, packages whether shipped by the Post Office or private carriers, containers for food or drugs, biohazard materials, chemicals, nuclear materials, and hazardous waste. Additional uses include large containers such as train boxcars or tankers, rooms or buildings, air and space craft, vehicles, ships and submarines where immediate knowledge of damage or holes in the hull is vital, crime evidence, body bags, as well as evidence rooms, lockers, and crates. The tamper detection system provides the capability to provide tamper and damage detection for anything that must be sealed and remain secure in the knowledge that there has been no tampering.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIG. 2-A is a circuit schematic illustration of composite and conductive layers of the tamper detection system of FIG. 1;

FIG. 2-B is a circuit schematic illustration of an alternate arrangement of composite and conductive layers of the tamper detection system;

FIG. 4-A is an illustration of a shipping envelope that includes the tamper detection system;

FIG. 4-B is an illustration of an alternate embodiment of a tamper detection system that is a shipping envelope;

FIG. 4-C is an illustration of an alternate embodiment of a tamper detection system that is a pouch container;

FIG. 4-D is an illustration of an alternate embodiment utilizing a tamper detection system pouch within a shipping envelope;

FIG. 5-A is an illustration of a shipping box that includes the tamper detection system;

FIG. 5-B is an illustration of an alternate embodiment of a shipping box that is a tamper detection system;

FIG. 7-A is an illustration of a pallet of boxes having contents for shipping;

FIG. 7-B is an illustration of a pallet of boxes partially wrapped by tamper detection system packaging;

DETAILED DESCRIPTION

A microprocessor-controlled system is provided for monitoring a package, container, or other material wrapped by film-type packaging, for detecting unwanted tampering, recording parameters related to the tampering, and optionally for initiating countermeasures in response to the tampering.

The tamper detection system provides for detection of tampering more-so than its prevention, although countermeasures against, or in response to, tampering are provided for some embodiments. Countermeasures may include radio frequency alert for a tracking signal, or destruction or marking of package contents. Such countermeasures may include, for example, dye bombs to mark a currency with ink for ease of future detection and/or tracking of the currency and/or the purveyors of the tampering or theft of the currency.

Upon sealing the material within the container, a microprocessor arms the system and a clock function begins. An external contact point provides capability for the package sender to record the microprocessor serial number and sealing time. If the package is punctured, cut, or otherwise damaged in route, that event is recorded by the microprocessor and a reset function is activated for the next potential event. Upon receipt of the package, the receiver may interrogate the package and download the available event log. Knowledge of the package transit route provides for comparison with elapsed time and calculation of the location of any tampering or damage. In some instances, an alert is communicated via available communication channels for providing indication of a tampering event.

Figure 1:
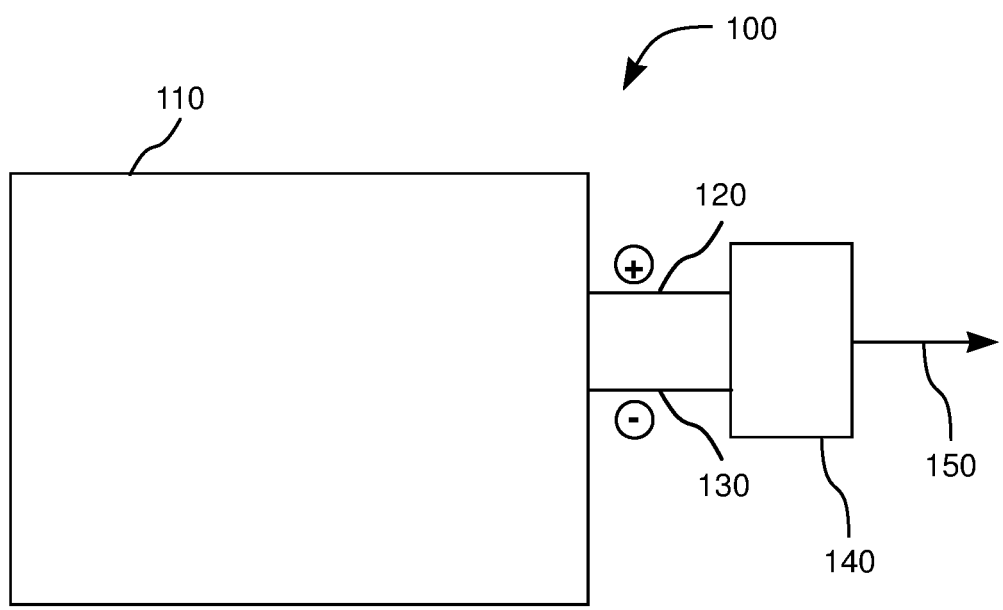
FIG. 1 is an illustration of a tamper detection system according to the present invention.

FIG. 1 is an illustration of a microprocessor-controlled tamper detection system 100 for monitoring and detection of unwanted tampering with the contents of a shipping package or any other container for which there is a desire for protection against of the contents from unwanted tampering. FIG. 2-A is a circuit schematic illustration of composite and conductive layers that make up an embodiment of the tamper detection system 100-A. Similarly, FIG. 2-B is a circuit schematic illustration for an alternate arrangement of composite and conductive layers that make up an alternative embodiment of the tamper detection system 100-B.

The tamper detection system 100 in its most basic form includes a layered composite material 110, connected to a microprocessor 140 via a first lead attachment 120 and a second lead attachment 130. The first lead attachment 120 connects to a first terminal 122 within the layered composite material 110, and the second lead attachment 130 connects to a second terminal 132 within the layered composite material 110.

In one embodiment, the microprocessor 140 communicates via a proprietary output adaptable to various applications. In another embodiment, the microprocessor 140 communicates via an RS232 port. From the port outward, hardwired connections to positive and negative contacts and clips, sound, signal, and light connectors are provided.

Each microprocessor is uniquely identified with an embedded serial number identifier. Unwrapping an object sealed via the tamper detection system 100 and then resealing in a new seemingly identical package will reveal on receipt and interrogation of the package that a swap has occurred.

Attempts to destroy the package to try and destroy the microprocessor 140 will fail if not very thoroughly executed. The availability and use of "printed batteries" and ultra thin microprocessors in a film of silicone ribbon make the microprocessor 140 hard to detect by simple feel or touch. The overt damage of a package utilizing the tamper detection system 100 makes it suspect merely by visual inspection.

Additionally, the battery systems within the tamper detection system 100 have a duty life proportional to use. Envelopes and packages intended for short- or near-term delivery have typical service duration on the order of weeks. Larger and/or long-term shipping or storage containers are provided with capability to last for months or years according to the desired use.

The microprocessor-controlled tamper detection system 100 detects if and when a secured package or container has been compromised by tampering. The tamper detection system 100 is made from lightweight composite materials to provide security for the package. The tamper detection system 100 provides for capture of data via the microprocessor 140 that records the exact location of the breach, as well as other information, and can also trigger a specified predetermined action in response.

In one embodiment, the layered composite material 110 is made from two conductive layers 112 and 112b separated by three insulating or nonconductive layers 114a, 114b, and 114c. In one embodiment, the conductive layers 112 and 112b are formed from a metal foil. It should be noted that the conductive layers 112 and 112b can be formed from any metallic material having sufficient conductivity and that can be made suitably flexible while maintaining its conductivity. In the illustrated embodiment of FIG. 2-A, a conductive layer 112a is compressed between a first nonconductive layer 114a and a second nonconductive layer 114b. A second conductive layer 112b is compressed between the second nonconductive layer 114b and a third nonconductive layer 114c. Together the two conductive layers 112 and 112b form a circuit, or switch, that is connected to the microprocessor 140. Tampering with the package punctures or otherwise damages the conductive layers 112 and 112b by electrically removing at least one of the nonconductive layers 114a, 114b, or 114c that separates them. Once a connection is made between the conductive layers 112 and 112b, the microprocessor 140 causes the breach to be noted and recorded.

FIG. 2-B illustrates an alternative embodiment of the microprocessor-controlled tamper detection system 100-B, in which the composite material 110 includes layers that are tiered so that the nonconductive layers 114a, 114b, and 114c along with the conductive layers 112a and 112b all exposed near the same point for ease in connecting the first lead attachment 120 to the first lead terminal 122' and also connecting the second lead attachment 120 to the second lead terminal 132'.

In various exemplary embodiments, the nonconductive layers 114a, 114b, and 114c polyester films are manufactured and stretched to provide a high tensile strength. One common form is biaxially-oriented polyethylene terephthalate (BoPET) and is a polyester film made from stretched polyethylene terephthalate (PET). PET provides high tensile strength, chemical and dimensional stability, transparency, reflectivity, gas and aroma barrier properties, in addition to the desired electrical insulation capabilities. One brand name for BoPET is Mylar®, among many others.

In some instances Biaxially-oriented PET is metalized by depositing a thin film onto the BoPET surface. A thin film of evaporated gold, aluminum, or another metal is vapor deposited onto the thin film to form the conductive layers 112a and 112b. Conductive indium tin oxide or other coatings can also be applied via sputter deposition, for example. Again, it should be noted that the conductive layers 112a and 112b can be formed from any metallic material having sufficient conductivity, and that can be made suitably flexible while maintaining its conductivity.

BoPET is a flexible synthetic film having many uses, such as a base for adhesive or pressure sensitive tapes for marking, packaging, or strapping applications, among many others. In the present disclosure and for simplicity of explanation, the term aluminized BoPET is used for an exemplary thin film material coated on one side with aluminum. A sometimes common equivalent and comparable term is aluminized Mylar®. It should be noted that other flexible synthetic films coated on one-side with a conductor and on the other side with an insulator, are also suitable for use in the tamper detection system 100.

Wrapping or sealing an object in aluminized BoPET provides slightly different results than various aluminum alloy powders. Pure aluminum is preferable to aluminum-bronze or aluminum-silicon. In one embodiment, a desirable BoPET and powder coating thickness is approximately 50 micrometers. A uniformity of the aluminum powder coating is important for maintaining consistent conductivity of the slightly stretched packaging material.

One advantage of coated BoPET over metal foil is weight and flexibility. Another advantage is that only one side of the material need be conductive. This provides for a reduced total wrap thickness. While the illustrated example includes a complete BoPET laminate having five layers, an embodiment of the tamper detection system 100 can also be made from a complete laminate having four layers. A four layer BoPET laminate includes (1) an exterior with a nonconductive outer face and a conductive inner face, (2) an interior that also has a nonconductive outer face and a conductive inner face, (3) an interior with both sides being nonconductive, and (4) an exterior with a conductive inner face and a nonconductive outer face.

In another embodiment, a plain metal foil is utilized and includes five layers of material rather than four. In such an embodiment, the five layers include alternating insulator materials and metal foil. Otherwise, the five-layer embodiment operates the same as the above-referenced four layers of aluminized BoPET. That is one layer of aluminized BoPET includes both an insulator on one side and a conductor on the other side so that one layer of aluminized BoPET performs double duty as both insulator and conductor.

It should be noted also that the use of aluminized BoPET, for example, produces a thinner version of the packaging. As such, the aluminized BoPET may be better for use in some packaging applications.

In one exemplary embodiment of the tamper detection system 100, the three nonconductive layers 114a, 114b, and 114c are provided by BoPET film layers that separate the conductive layers 112 and 112b from each other. Together, the nonconductive layers 114a, 114b, and 114c and the conductive layers 112 and 112b form the layered composite material 110 or packaging.

It should be noted also that the tamper detection system 100 can be constructed from any number of layers so long as those layers include insulating or nonconductive layers 114a, 114b, and 114c to separate the conductive layers 112 and 112b. Such layers can be constructed from five individual layers, or from a group of multi-sided materials having, for example, insulating material on one side and conductive material on the other side, or any other such arrangement to construct the arrangement described above. It should be noted also that the layers can be constructed and/or assembled from any type material that can be utilized to form the respective conductive or insulating layer. In one embodiment, the respective layers are formed from a spray-on type material that is utilized to apply the respective layer, as noted above. In one embodiment, a conductive layer is applied via spraying the conductive material to a BoPET material. Another BoPET material layer is applied adjacent the spray-on conductive layer. The process is repeatable to provide the desired number of conductive and non-conductive layers necessary for the particular situation.

In another embodiment, a non-conductive or insulating layer is applied via spraying the material in the desired location, then a conductive layer is applied via spraying over the insulating layer. Additional layers of non-conductive, conductive, and then non-conductive materials are sprayed respectively until the desired number of layers are applied.

Figure 3:
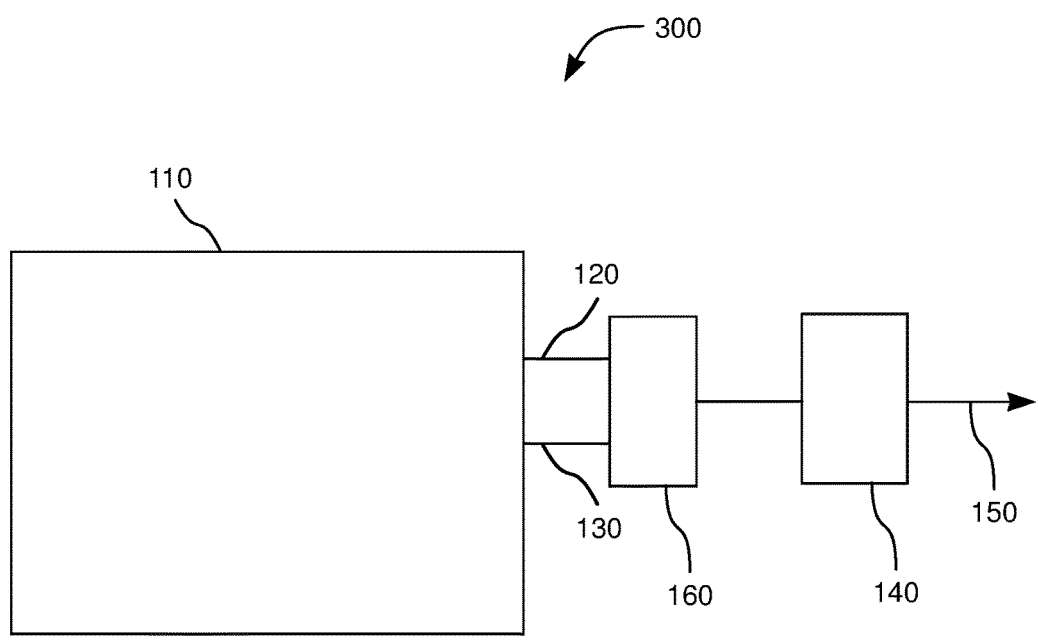
FIG. 3 is an illustration of a tamper detection system with an additional sensor as part of the circuit.

FIG. 3 is an illustration of a tamper detection system 300 with an additional sensor 160 included as part of the circuit. Along with the microprocessor 140, the sensor 160 is manufactured within the layered composite material 110 and is undetectable to a visual inspection of the tamper detection system 300. One or more additional sensors 160 are added to various embodiments of the tamper detection system 100 to provide additional monitoring and or detection capabilities and associated data recording relating to various events. In such additional embodiments, the microprocessor 140 can record sensor information of temperature, barometric pressure, altitude, moisture, and crush force. Utilizing this collected information, the microprocessor 140 can issue or relay a command to take various type defensive or offensive actions.

As illustrated in FIG. 1, FIG. 2-A, FIG. 2-B, and FIG. 3, the microprocessor-controlled tamper detection system 100 is an inexpensive, disposable, composite material 110 made of special insulating and conductive layers, connected to a self-contained microprocessor 140. The tamper detection system 100 is incorporated into everyday items such as envelopes, boxes, and bags, for example, and is visually undetectable.

Piercing or cutting of the composite material causes the chip to quietly record the time and date of the tampering, and optionally to illuminate a telltale LED light, or to trigger a countermeasure action, i.e. dye bomb, radio signal, etc., if so programmed. The tamper detection system 100 provides specialized applications that detect temperature and pressure changes, to reveal such problems as thawing, overheating, or crushing of the package.

In one embodiment, the tamper detection system 100 provides capability for shipping of pharmaceuticals, legal evidence, confidential documents, and such like, with greater additional security and accountability than ever before. The relative low cost provides for wide use by customs officials, carriers such as FedEx and UPS, legal industry, medical industry, the military, and the public at large.

It should be noted also that the tamper detection systems 100 described herein can be used to provide tamper and damage detection security to many closed systems, from a simple envelope, to a box, a vehicle, and even a space craft or fighter jet. As noted above, specific embodiments provide many uses for the tamper detection system 100. Such anti tamper detection includes letters, packages whether shipped by the Post Office or private carriers, containers for food or drugs, biohazard materials, chemicals, nuclear materials, and hazardous waste. Additional uses include large containers such as train boxcars or tankers, rooms or buildings, air and space craft, vehicles, ships and submarines where immediate knowledge of damage or holes in the hull is vital, crime evidence, body bags, as well as evidence rooms, lockers, and crates. The tamper detection system 100 provides the capability to provide tamper and damage detection for anything that must be sealed and remain secure in the knowledge that there has been no tampering.

The tamper detection system 100 operates effectively as a switch, triggered by altering an electrical property in flexible packaging wrap. The microprocessor 140 monitors the composite material 110. Depending on the application, the electrical alteration can be a dead short in the packaging (bridging between two conductive layers as in a penetration through at least a portion of the packaging), a capacitive discharge from an electrical layer to ground (scraping away the outside insulating layer), or tampering with sensors to change conductivity or other electrical properties.

In one embodiment, the tamper detection system 100 is a sealed, monitored, sensor system. A change beyond the specifications of allowable parameters is measured by the microprocessor and an action is provided as a result. For example, a penetration of the exterior insulating layer and cutting or applying pressure to just one conductive layer with a metallic or nonmetallic tool can cause such a change.

Temperature, interior and exterior atmospheric pressures, and interior crush sensors may also be monitored by the microprocessor 140. The triggering methods chosen are based on use and cost considerations. The composite packaging material 110 and the microprocessor units 140 are disposable and represent effective but very low cost security. It should be appreciated that the use of additional sensors provide for multiple configurations and variations depending on the particular requirements.

As noted above, the tamper detection system provides for detection of tampering more-so than its prevention, although countermeasures against, or in response to, tampering are provided for some embodiments. In some embodiments, the countermeasures include sending a radio frequency alert as a tracking signal, or even destruction or marking of the package contents. In one embodiment, a dye bomb is activated to mark a currency with ink for ease in future detection and/or tracking of the currency and/or the purveyors of the tampering or theft of the currency. In another embodiment, an alert is transmitted via available communication channels, such as WiFi, WAN, LAN, or available cellular and other communication methods. The alert can be as simple as a text message to a prescribed number or location, an email communication to one or more parties, or as complex as a telemetry data dump to a designated recipient or recipients.

Additionally, the tamper detection system 100 provides for triggering a specified predetermined action in response to a breach. For example, in an embodiment that includes one or more sensors 160, the tamper detection system 100 can record the information provided by a sensor 160 and further utilize that information to issue or relay a command for defensive or offensive actions. Such actions can be tied to specific type events, for example, as determined by the type sensor 160 and/or the data provided by that sensor 160.

FIG. 4-A is an illustration of an embodiment of a tamper detection system 400-A as applied to a shipping envelope 402. In the illustrated embodiment, a variation of the tamper detection system 400-A includes a paper or paper type mailing envelope 402 that includes an interior interleaving of insulating and conductive layers that form the composite material 110. In the illustrated embodiment, a specialized double-flap peel-destructive flap 410, 420 is utilized to activate the interior microprocessor 140 upon sealing of the envelope 402. In alternative embodiments, the interior microprocessor 140 is activated in any manner that is customarily utilized for activating or applying power to a microprocessor, such as a switch, a wireless signal, or completing a circuit in some other manner, for example. It will be readily appreciated that the primary concern for activation of the tamper detection system is that the interior microprocessor 140 is activated and initialized so that monitoring the package for tamper detection is initiated.

In one less expensive and also simple embodiment, a single external LED external to the package, and not shown, is lit by the microprocessor 140 as one indication of tampering or damage. Of course, other embodiments may include various methodologies for signaling that tampering of or with the package and/or its contents has taken place.

FIG. 4-B is an illustration of an alternate embodiment of a tamper detection system 400-B that is also a shipping envelope 404. In the illustrated embodiment, a variation of the tamper detection system 400-B is made from the interleaving of insulating and conductive layers into an alternative embodiment of the composite material 110' that forms an envelope 404. That is, the envelope 404 is made from the composite material 110' itself. In such an embodiment, at least one of the insulating and/or conductive layers also provides the rigidity necessary for the particular envelope design.

As noted above, and in a similar basic form, the tamper detection system 400-B includes a layered alternative composite material 110', connected to a microprocessor 140 via positive and negative connectors. In the illustrated embodiment of FIG. 4-B, the alternative composite material 110' also has enough rigidity to form the envelope 404.

In one embodiment, and similar to above, the layered alternative composite material 110' is made from two conductive layers such as a metal foil 112 and 112b separated by three insulating or nonconductive layers 114a, 114b, and 114c. In one embodiment, the rigidity or structure necessary for an envelope 404 is provided by one or more of the three insulating or nonconductive layers 114a, 114b, and 114c, for example.

As also noted above, the tamper detection system 400-B can be constructed from any number of layers so long as those layers include three insulating or nonconductive layers to separate the two conductive layers, and further so long as one of the layers provides the structure or rigidity necessary for the envelope 404. As such, it should be noted that the layers can be constructed and/or assembled from any type material that can be utilized to form the respective conductive and/or non-conductive layers.

FIG. 4-C is an illustration of an alternate embodiment of a tamper detection system that is also a pouch container 430. The pouch container 430 is a typical shipping type pouch container such as is often used for the shipping of materials or products for which it is desired that the product be unopened. Such materials might include printed circuit boards, hard drives, USB devices, electronic products, compact discs, DVDs, evidence, medical products and devices, prescription drugs, pharmaceuticals, and many other products. Of course, the particular products that are often shipped in such pouches are many and varied.

The pouch container 430 includes a seal 432 at the open-able end. For many existing shipping type pouches the end may be re-sealable or non re-sealable. In the illustrated embodiment, the pouch container 430 is made from an interleaving of the insulating and conductive layers of the composite material 110. That is, the pouch container 430 is made from the composite material 110. In the illustrated embodiment, and similarly as above, a specialized double-flap peel-destructive flap is utilized to seal the contents within and to trigger the interior microprocessor 140 for monitoring upon sealing of the pouch container 430. In various alternative embodiments, the interior microprocessor 140 is activated in any manner that is customarily utilized for activating or applying power to a microprocessor, such as a switch, a wireless signal, or completing a circuit in some other manner, for example. It will be readily appreciated that the primary concern for activation of the tamper detection system is that the interior microprocessor 140 is activated and initialized so that monitoring the package for tamper detection is initiated.

Once the contents are sealed within the pouch container 430, then any damage or tampering will activate the microprocessor 140 to record the related information and/or to take any further action as programmed.

As also noted above, the pouch container 430 can be constructed from any number of layers so long as those layers include three insulating or nonconductive layers to separate the two conductive layers. In some embodiments, at least one of the layers provides any additional structure necessary for the pouch and its desired contents. As such, it should be noted that the layers can be constructed and/or assembled from any type material that can be utilized to form the respective conductive and/or non-conductive layers.

It should be noted also, that the pouch container 430 in the illustrated example encompasses a pouch similar to many flat, rectangular type pouches that are utilized for the shipping of such products. However, it is also envisioned that such pouch containers could include many shapes and sizes. There is no reason that the pouch could not include any variety of geometric shapes so long as the contents are sealed within and the interior microprocessor 140 is activated for monitoring. In one embodiment, similarly as above, a specialized double-flap peel-destructive flap is utilized to seal the contents within and to activate the interior microprocessor 140. Such a flap need not extend across an entire end of the pouch container 430 for example. In one non-limiting example, a balloon type pouch container 430 with a narrow spout could just as easily be utilized with a relatively limited size for activating and sealing as compared with the overall dimensions of the pouch container 430. In similar manner as noted above, various embodiments provide for activating and initiating the interior microprocessor 140 in any manner that is customarily utilized for applying power to a microprocessor, such as a switch, a wireless signal, or completing a circuit in some other manner, for example. It will be readily appreciated that the primary concern for activation of the tamper detection system is that the interior microprocessor 140 is activated and initialized so that monitoring the package for tamper detection is initiated.

FIG. 4-D is an illustration of tamper detection system pouch container 430 utilized within a shipping envelope 402. Once the contents requiring tamper detection monitoring are sealed within the pouch container 430, then the pouch container 430 is placed within a shipping envelope 402 and deposited with a respective mailing or shipping entity. It should be noted also that a pouch container 430 or multiple pouch containers may be placed within a shipping envelope 402 or any other type shipping package as space and any other desired shipping constraints allow.

FIG. 5-A is an illustration of an embodiment of a tamper detection system 500-A applied to a shipping box 502. In the illustrated embodiment, a variation of the tamper detection system 500-A includes a cardboard shipping box 502 that includes an interior interleaving of insulating and conductive layers that form the composite material 110. In the illustrated embodiment, a specialized double-flap peel-destructive flap 510, 520 triggers the interior microprocessor 140 upon sealing of the shipping box 502. In various alternative embodiments, the interior microprocessor 140 is activated in any manner that is customarily utilized for activating or applying power to a microprocessor, such as a switch, a wireless signal, or completing a circuit in some other manner, for example. As noted previously, it will be readily appreciated that the primary concern for activation of the tamper detection system is that the interior microprocessor 140 is activated and initialized so that monitoring the package for tamper detection is initiated.

In one alternative and less expensive embodiment, a single external LED external to the package, and not shown, is lit by the microprocessor 140 as an indication of tampering or damage. As above, one embodiment provides for a single external LED external to the shipping box that is lit by the microprocessor 140 as an indication of shipping or damage.

FIG. 5-B is an illustration of an alternate embodiment of a shipping box 504 that is a tamper detection system 500-B. In the illustrated embodiment, a variation of the tamper detection system 500-B is made from the interleaving of insulating and conductive layers into an alternative embodiment of the composite material 110' that forms a shipping box 504. That is, the shipping box 504 is made from the composite material 110' itself. In such an embodiment, at least one of the insulating and/or conductive layers also provides the rigidity necessary for the particular shipping box design.

As noted above, and in a similar basic form, the tamper detection system 500-B includes a layered alternative composite material 110', connected to a microprocessor 140 via positive and negative connectors. In the illustrated embodiment of FIG. 5-B, the alternative composite material 110' also has enough rigidity to form the shipping box 504.

In one embodiment, and similar to above, the layered alternative composite material 110' is made from two conductive layers such as a metal foil 112 and 112b separated by three insulating or nonconductive layers 114a, 114b, and 114c. In one embodiment, the rigidity or structure necessary for the shipping box 504 is provided by one or more of the three insulating or nonconductive layers 114a, 114b, and 114c, for example.

As also noted above, the tamper detection system 500-B can be constructed from any number of layers so long as those layers include three insulating or nonconductive layers to separate the two conductive layers, and further so long as one of the layers provides the structure or rigidity necessary for the shipping box 504. As such, it should be noted that the layers can be constructed and/or assembled from any type material that can be utilized to form the respective conductive layers.

Figure 6:
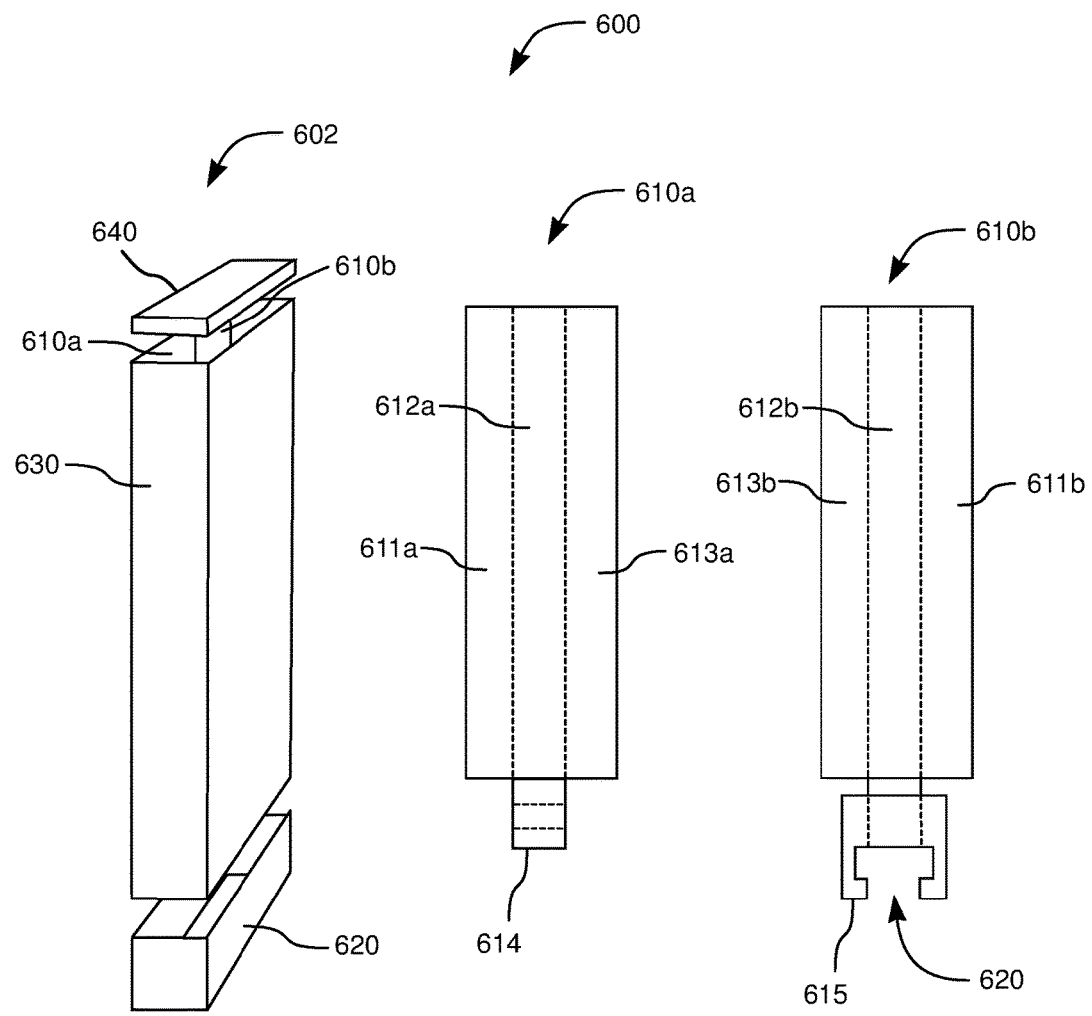
FIG. 6 is an illustration of a magazine cabinet for currency that makes use of the tamper detection system.

FIG. 6 is an illustration of an embodiment of the tamper detection system 600 applied to a magazine cabinet 600 for containing and/or dispensing currency. Such magazine cabinets 602 may be utilized in ATM machines, as well as currency exchange machines. The magazine cabinet 602 includes a base 620, the main cabinet 630, and a top plate or lid 640.

Alternative embodiments of the layered composite material 610a, 610b are adhered in halves to the inside of the main cabinet 630. The front 612a and back 612b of each half are adhered to the front and back (narrow ends visually in the orientation of the illustrated example) respectively of the main cabinet 630. The left sides 611a, 611b wrap along one edge of the main cabinet 630, and the right sides 613a, 613b wrap along the opposing edge of the main cabinet 630.

Each half of the layered composite material 610a, 610b also includes a base fold 614, 615 respectively. In the illustrated example, the base fold 615 of the back layered composite material 610b also includes an opening for an ink spray mechanism, for example, as part of a dye bomb capability. Of course, those skilled in the art will appreciate that alternative action capabilities can be provided by the various tamper detection systems disclosed herein.

Closing the lid 640, completes the circuit so that the lid becomes part of the tamper detection system 600 circuit.

In one embodiment, combination crush and thermal sensors are adhered at the top, middle, and bottom of the interior walls of the magazine cabinet 630. The sensors are made from a material that will fragment and break the thin, brittle wires embedded inside. Breaking the wires signals the microprocessor 140 that severe impacts and/or crushing forces are being applied to the magazine.

In another embodiment, thermocouple connections are included with the crush sensors and provide for temperature measurement. The thermocouple capability provides for the detection of rapid changes in temperature within the magazine cabinet 602. Such measurements can be recorded by the microprocessor, for example, to track the mean magazine cabinet temperature.

The layered composite material 610a, 610b covers the inside of the magazine cabinet. Any piercing or cutting causes the two inner conducting layers of metal foil to contact each other and completes the electrical circuit that triggers, for example, an ink jet spray system, or other desired action. The circuit is completed when physical contact occurs between the normally insulated metal foil layers.

As illustrated in the various embodiments of FIG. 1-6 above, the capabilities for collecting and recording data by the microprocessor 140 are many and varied. A few of the varied capabilities are discussed in detail below.

According to one embodiment, the tamper detection system 100 provides for reporting a penetration in a specific area of a package or panel. Grid detection, while more expensive than standard tamper detection, provides extremely valuable information in specific applications.

In one embodiment, sector detection is provided for individual aircraft or spacecraft doors, as well as fuselage or hull sections. Each piece or desired protection section is equipped with a dedicated tamper detection system 100. The tamper detection system 100 is wired to a common microprocessor bus.

Grids can be provided in large sheets or panels having square yard or square foot grids. The material is constructed of many smaller, individual sized tamper detection systems, with each wired to a common microprocessor bus.

Square inch detection is achieved via printing a complex grid pattern in the conductive layers of the sensors using nonmetallic conductive ink. The two conductive layers are adhered in a specific overlapping manner so that there is no unprotected area. Each square inch section of the grid has an individual reporting circuit, half in one conductive layer, the other half in the other conductive layer. The circuits connect to collector buses that report to one or more microprocessors.

In one embodiment, the sensor material can be used in spaced parallel sheets to detect and calculate the trajectory of incoming small arms fire, for example. In such an embodiment, embassy and consulate buildings, guard and observation posts, and other areas subject to sniper or hostile fire are provided with the capability to record forensic data of the time and angle of fire, or with a more advance microprocessor and/or system, plot return fire azimuths. Such an embodiment utilizes a variation of the square inch grid-locating configuration described above, with two-inch squares on the outer panel, and one-inch squares on the inner panel. Arranged in parallel, and spaced four to six inches apart, two panels allow precise trajectory calculations as a projectile passes through them.

FIG. 7-A is an illustration of a pallet of boxes 700 having contents for shipping, and FIG. 7-B is an illustration of the pallet of boxes 700 partially wrapped by the microprocessor-controlled tamper detection system 100. FIG. 7-A illustrates a typical pallet 710 loaded with boxes 720. In the illustrated embodiment, each box 720 is the same. It should be noted that the boxes 720 need not necessarily be identical to each other, though wrapping and securing the boxes 720 is simpler if they are of generally the same dimensions.

In one embodiment, the boxes 720 include materials for which tamper detection is desired. Such materials may include medicine, for example. It should be appreciated that the boxes can include any material for which tamper detection and protection is desired, such as medicine, food, legal materials, crime data or evidence, or many other materials, for example.

In FIG. 7-B, the pallet of boxes 700 is partially wrapped by a packaging material utilizing the microprocessor-controlled tamper detection system 100. In the illustrated example, two layers of the layered composite material 110 are wrapped around a portion of the stack of boxes 720. One layer of composite material 100 is completely wrapped, while a second layer is mostly wrapped but not yet closed around the boxes. Of course, the layered composite material 110 of the microprocessor-controlled tamper detection system 100 can also be wrapped over the top of the stack of boxes 720, before or after wrapping around the sides. In some embodiments, the wrapping can also include the bottom of the stack of boxes 720 as well as the top.

Figure 8:
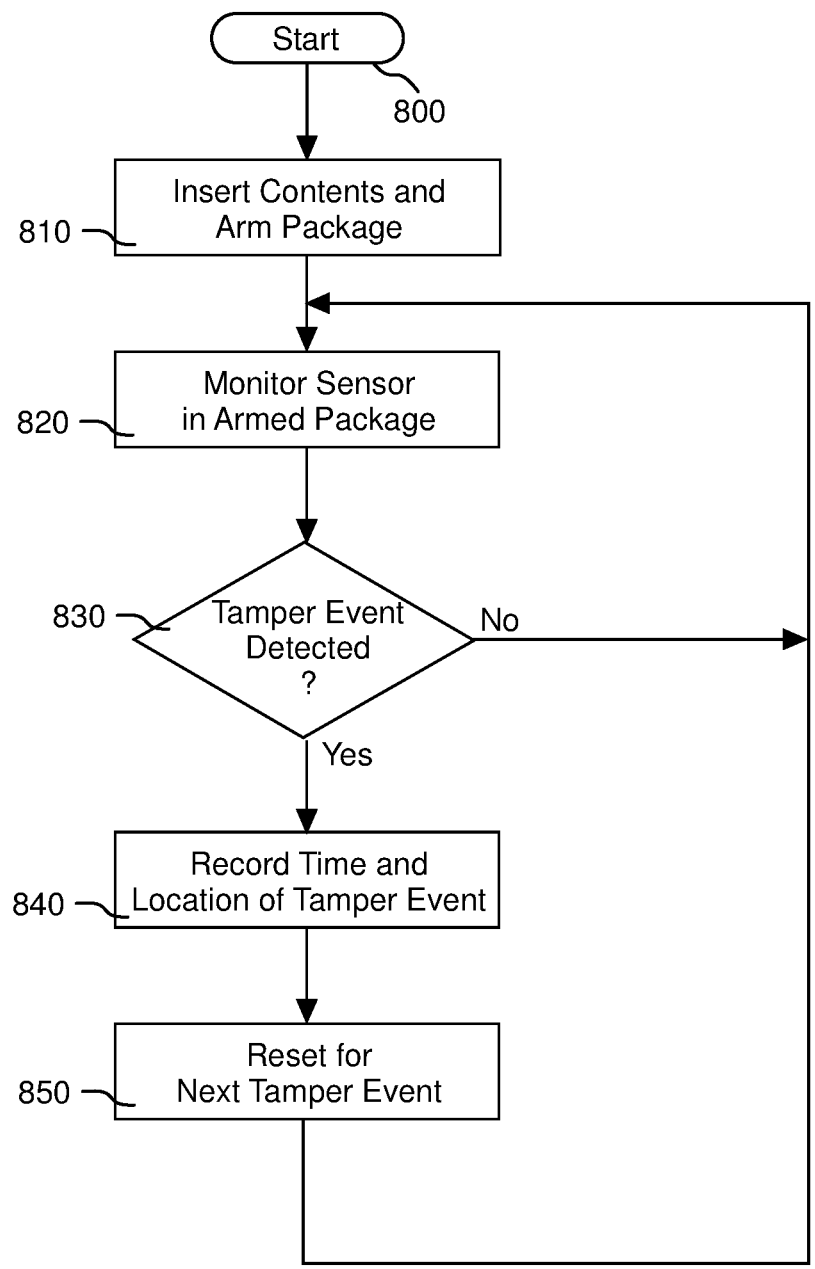
FIG. 8 is a flowchart that illustrates arming and monitoring of a tamper detection system for use with a package.

FIG. 8 is a flowchart 800 that illustrates arming and monitoring of a tamper detection system 100 for use with a package or other container. Once contents are placed into the container and the package is sealed, the initiation process for arming the package begins at step 810. At step 820, the microprocessor 140 begins monitoring for input from the tamper detection system 100. If no tamper event is detected at step 830, the microprocessor maintains a loop beginning at step 820 to continue monitoring for a tamper event.

Once a tamper event is detected at step 830, the processor records the time and location of the tamper event. The microprocessor 140 then resets at step 850 for the next tamper event, and then proceeds back into the loop beginning at step 820 to monitor for new tamper events.

Figure 9:
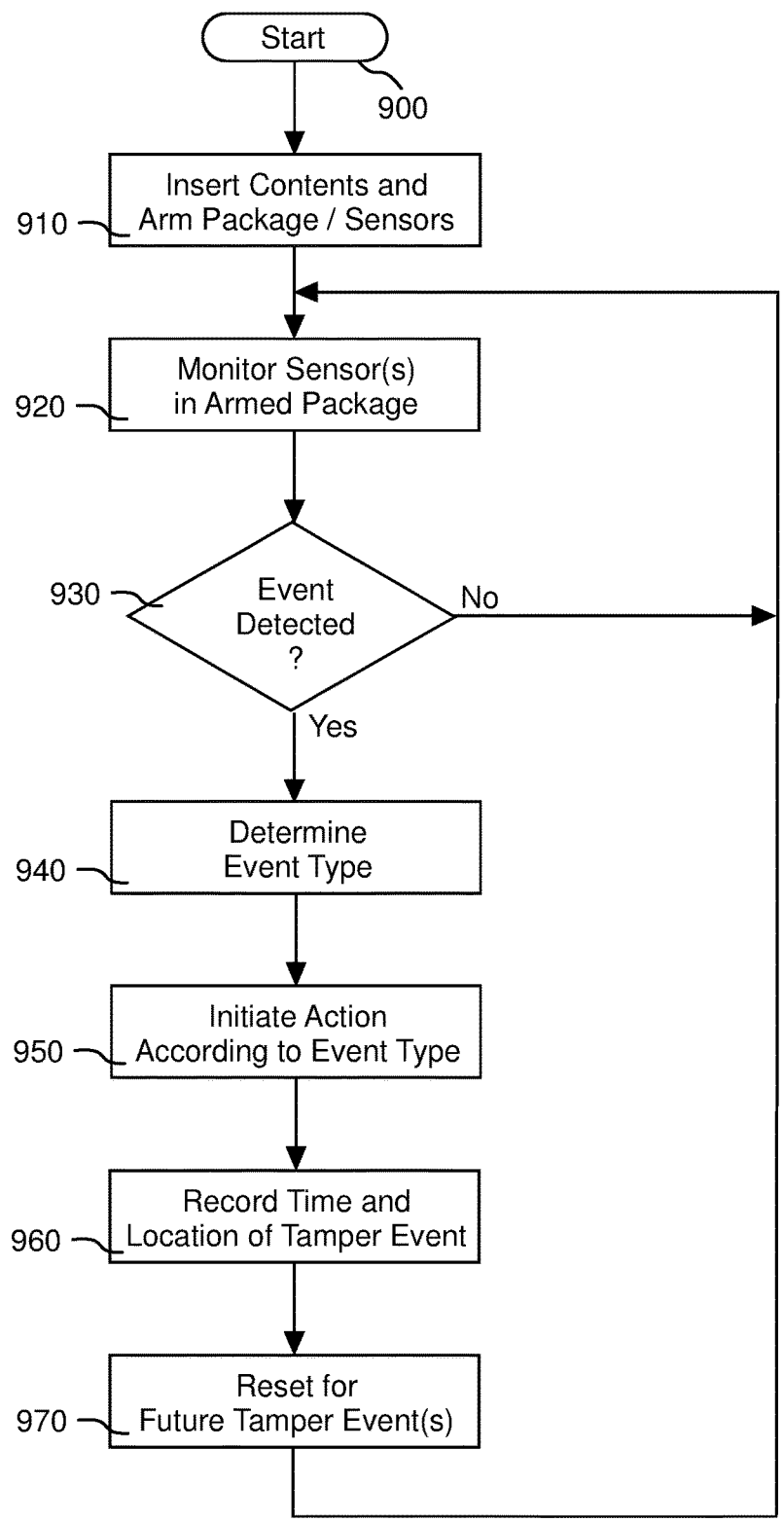
FIG. 9 is a flowchart that further illustrates arming and monitoring a tamper detection system that includes an additional sensor for use with a package.

FIG. 9 is a flowchart 900 that further illustrates arming and monitoring a tamper detection system 100 that includes additional sensors for use with a package or other container. As above, once contents are placed into the container and the package is sealed, the initiation process for arming the package begins at step 910. At step 920, the microprocessor 140 begins monitoring for input from the tamper detection system 100, including the additional sensor notification capabilities. If no tamper event is detected at step 930, the microprocessor maintains a loop beginning at step 920 to continue monitoring for a tamper event or other sensor notification.

Once a tamper event is detected at step 930, the microprocessor 140 determines the event type at step 940. Determination of the event type is dependent on the various data parameters that are available from the sensor readings. Any actions required by the particular event type are initiated at step 950. The data related to the tamper and/or other event are recorded along with the time and location at step 960.

The microprocessor 140 then resets at step 970 for the next tamper event, and then proceeds back into the loop beginning at step 920 to monitor for new events.

Figure 10:
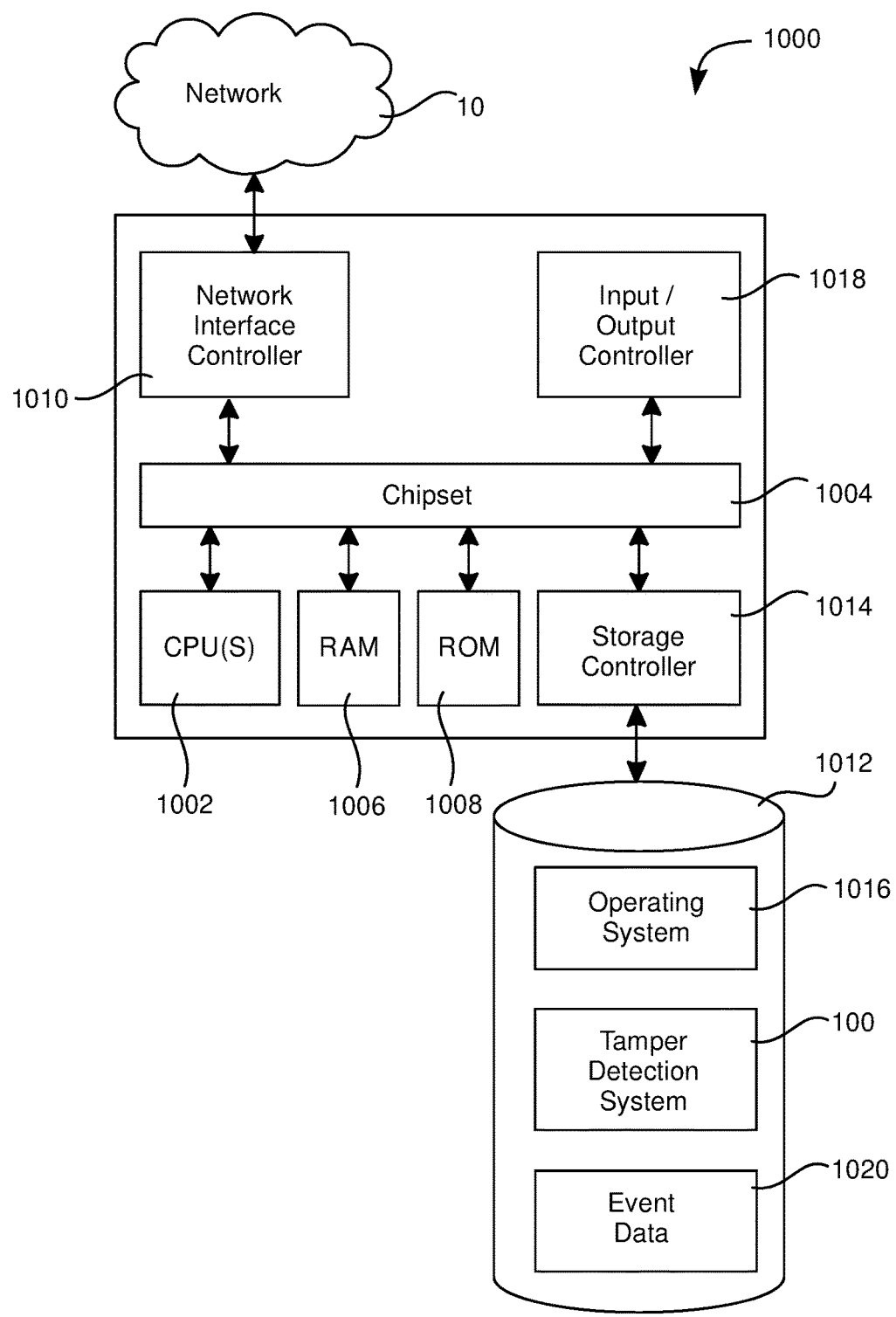
FIG. 10 is a computer architecture diagram showing an illustrative computer hardware architecture for computing devices described in embodiments presented herein.

FIG. 10 shows an example computer architecture for a computer 1000 capable of executing the software components described herein. The computer architecture shown in FIG. 10 illustrates a conventional server computer, workstation, desktop computer, laptop, network appliance, personal digital assistant ("PDA"), electronic book reader, digital cellular phone, or other computing device, and may be utilized to execute any aspects of the software components presented herein and/or to interact with or execute the capabilities of the microprocessor 140 of the tamper detection system 100. For example, and without limitation, the computer architecture shown in FIG. 10 might be utilized to implement computer systems that execute software components for implementing all or part of the functionality provided by the microprocessor 140, the tamper detection system 100, sensors 160, processing and storage of event data 1020 and various external devices for storage of data, managing and/or monitoring tampering and/or security.

The computer 1000 includes a baseboard, or "motherboard," which is a printed circuit board to which a multitude of components or devices may be connected by way of a system bus or other electrical communication paths. In one illustrative embodiment, one or more central processing units ("CPUs") 1002 operate in conjunction with a chipset 1008. The CPUs 1002 are standard programmable processors that perform arithmetic and logical operations necessary for the operation of the computer 1000.

The CPUs 1002 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1008 provides an interface between the CPUs 1002 and other components and devices on the baseboard. For instance, the chipset 1008 may provide an interface to a random access memory ("RAM") 1004, used as the main memory in the computer 1000. The chipset 1008 may further provide an interface to a computer-readable storage medium such as a read-only memory ("ROM") 1006 or non-volatile RAM ("NVRAM") for storing basic routines that help to startup the computer 1000 and to transfer information between the various components and devices. The ROM 1006 or NVRAM may also store other software components necessary for the operation of the computer 1000 in accordance with the embodiments described herein.

According to various embodiments, the computer 1000 may operate in a networked environment using logical connections to remote computing devices and computer systems through the network 10, such as a local-area network ("LAN"), a wide-area network ("WAN"), the Internet, or any other networking topology known in the art that connects the computer 1000 to remote computers. The chipset 1008 includes functionality for providing network connectivity through a network interface controller ("NIC") 1010, such as a gigabit Ethernet adapter. The NIC 1010 is capable of connecting the computer 1000 to other computing devices over the network 10. It should be appreciated that any number of NICs 1010 may be present in the computer 1000, connecting the computer 1000 to various types of networks and remote computer systems.

The computer 1000 may be connected to a mass storage device 1014 that provides non-volatile storage for the computer 1000. The mass storage device 1014 may store system programs, application programs, other program modules, and data, which are described in greater detail herein. The mass storage device 1014 may be connected to the computer 1000 through a storage controller 1012 connected to the chipset 1008. The mass storage device 1014 may consist of one or more physical storage units. The storage controller 1012 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 1000 may store data on the mass storage device 1014 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1014 is characterized as primary or secondary storage, and the like. For example, the computer 1000 may store information to the mass storage device 1014 by issuing instructions through the storage controller 1012 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1014 by detecting the physical states or characteristics of one or more particular locations within the physical storage units.

In addition to the mass storage device 1014 described above, the computer 1000 may have access to other computer-readable storage media to store and retrieve information, such as program modules, data structures, or other data. It should be appreciated by those skilled in the art that computer-readable storage media can be any available non-transitory media that may be accessed by the computer 1000.

By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1014 may store an operating system 1018 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1014 may store other system or application programs and data utilized by the computer 1000, such as the microprocessor 140, the tamper detection system 100, sensors 160, processing and storage of event data 1020 and various external devices for storage of data, managing and/or monitoring tampering and/or security, each of which was described above in regard to FIGS. 1-8.

In one embodiment, the mass storage device 1014 or other computer-readable storage media may be encoded with computer-executable instructions that, when loaded into the computer 1000, may transform the computer from a general-purpose computing system into a special-purpose computer capable of implementing the embodiments described herein. These computer-executable instructions transform the computer 1000 by specifying how the CPUs 1002 transition between states, as described above. According to one embodiment, the computer 1000 may have access to computer-readable storage media storing computer-executable instructions that, when executed by the computer, perform the routines 700, and 900 described above with regard to FIGS. 7 through 9, respectively.

The computer 1000 might also include an input/output controller 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that various concepts and technologies for providing anti-tamper and damage detection, have been presented herein. Although some of the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

Accordingly, the present invention may be realized in hardware, software, or a combination thereof. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system comprising:
   a layered composite material that includes a combination having two flexible conductive layers separated by an inner non-conductive layer, and the combination contained within two separate outer non-conductive layers, each of the respective inner and outer non-conductive layers being a thin polyester film, the layered composite material providing flexibility for enclosure and containment of one or more items;
   a thin film microprocessor within a portion of the layered composite material, the microprocessor having a unique embedded identifier;
   the microprocessor connected to the respective conductive layers via a first terminal at the first flexible conductive layer and a second terminal at the second flexible conductive layer; and
   one or more modules for execution by the microprocessor to:
      arm the system upon the one or more items being sealed within the layered composite material;
      upon determination of a change in electrical properties of the layered composite material, recording a detected event for evidence of tampering, the event including time and other available data; and
      upon recording the detected event, resetting the system for possible detection of a future event.

2. The system of claim 1, each non-conductive layer further comprising biaxially-oriented polyethylene terephthalate (BoPET).

3. The system of claim 1, each flexible conductive layer further comprising a metal foil.

4. The system of claim 3 wherein the metal foil is one of:
   aluminum;
   aluminum alloy; and
   a conductive metal.

5. The system of claim 2 further comprising, at least one non-conductive layer that includes a thin film metalized layer deposited onto a surface of the biaxially-oriented polyethylene terephthalate to replace one of the flexible conductive layers.

6. The system of claim 2 further comprising, at least one non-conductive layer that includes a spray-on metalized layer deposited onto a surface of the biaxially-oriented polyethylene terephthalate to replace one of the flexible conductive layers.

7. The system of claim 5 wherein the thin film metalized layer comprises one of the following:
   gold;
   aluminum;
   indium tin oxide;
   a conductive metal.

8. The system of claim 1, each thin polyester film manufactured and stretched to provide high tensile strength.

9. The system of claim 1, further comprising at least one sensor within the layered composite material, the sensor providing measurement data available to the microprocessor for at least one of:
   temperature;
   barometric pressure;
   altitude;
   moisture; and
   crush force.

10. The system of claim 9, further comprising at least one module for execution by the microprocessor to retrieve data from the at least one sensor.

11. The system of claim 10, further comprising at least one module for execution by the microprocessor to record the retrieved data from the at least one sensor in accordance with the detected event.

12. The system of claim 11, further comprising at least one module for execution by the microprocessor to provide an action in response to the detected event in accordance with the retrieved data.

13. A method comprising:
   arming a system upon one or more items being sealed by a layered composite material, the layered composite material including a combination having two flexible conductive layers separated by an inner non-conductive layer, and the combination contained within two separate outer non-conductive layers, each of the respective inner and outer non-conductive layers being a thin polyester film, the layered composite material providing flexibility for enclosure and containment of the one or more items;
   upon determination of a change in electrical properties of the layered composite material, recording an event for evidence of tampering, the event including time and other available data; and upon recordation of the event, resetting and rearming the system for possible detection of a future event.

14. The method of claim 13, further comprising arming the system via a thin film microprocessor within a portion of the layered composite material, the microprocessor having a unique embedded identifier.

15. The method of claim 13, further comprising arming at least one sensor within the layered composite material, the at least one sensor providing measurement data for at least one of:
- temperature;
- barometric pressure;
- altitude;
- moisture; and
- crush force.

16. The method of claim 15, further comprising retrieving data from at least one sensor within the layered composite material.

17. The method of claim 16, further comprising:
recording the retrieved data from the at least one sensor within the layered composite material.

18. The method of claim 16, further comprising executing an action in response to the retrieved data from the at least one sensor.

19. The method of claim 17, further comprising retrieving recorded event data and other retrieved data from the microprocessor.

* * * * *